United States Patent [19]

Kole

[11] 4,284,670
[45] Aug. 18, 1981

[54] METHOD FOR APPLYING LUBRICANTS ONTO METAL WORKING SURFACES

[75] Inventor: Richard P. Kole, Lower Burrell, Pa.

[73] Assignee: Aluminum Company of America, Pittsburgh, Pa.

[21] Appl. No.: 853,493

[22] Filed: Nov. 21, 1977

Related U.S. Application Data

[63] Continuation of Ser. No. 712,388, Aug. 6, 1976, abandoned.

[51] Int. Cl.³ .............................................. B05D 1/02
[52] U.S. Cl. .................................... 427/422; 427/421; 72/42; 72/43; 72/69; 72/236
[58] Field of Search ......................... 72/42, 46, 236, 69, 72/43, 44, 45; 427/421, 422

[56] References Cited

U.S. PATENT DOCUMENTS

| | | | |
|---|---|---|---|
| 2,140,289 | 12/1938 | Hurtt et al. ............................... | 72/43 |
| 2,302,857 | 11/1942 | Harder .................................... | 113/38 |
| 2,754,228 | 7/1956 | Bede ....................................... | 427/422 X |
| 2,821,016 | 1/1958 | Dickson .................................. | 29/424 |
| 2,849,107 | 8/1958 | Logue .................................... | 427/421 X |
| 2,855,330 | 10/1958 | Griswold et al. ....................... | 427/422 X |
| 3,393,658 | 7/1968 | Ott ......................................... | 118/7 |
| 3,463,399 | 8/1969 | Ott ......................................... | 239/186 |
| 3,523,437 | 8/1970 | Bales et al. ............................. | 72/43 |
| 3,605,473 | 9/1971 | Lyon et al. ............................. | 72/201 |
| 3,709,012 | 1/1973 | Larsonneor ............................ | 72/21 |
| 3,803,888 | 4/1974 | Hostetter et al. ...................... | 72/45 |
| 3,841,126 | 10/1974 | Minami et al. ......................... | 72/45 |

Primary Examiner—Shrive P. Beck
Attorney, Agent, or Firm—David W. Brownlee

[57] ABSTRACT

A method is disclosed for applying an ordinarily high viscosity lubricant as an atomized spray onto metal working surfaces without the use of high velocity air. The method comprises the steps of heating the lubricant to a temperature of approximately 170° to 300° F., hydraulically atomizing the lubricant by feeding the lubricant through a nozzle under a pressure of approximately 30 to 70 pounds per square inch whereby the relative velocity of the lubricant with respect to ambient atmosphere is increased upon exiting an orifice in the nozzle, and directing the lubricant onto the metal working surfaces.

5 Claims, 2 Drawing Figures

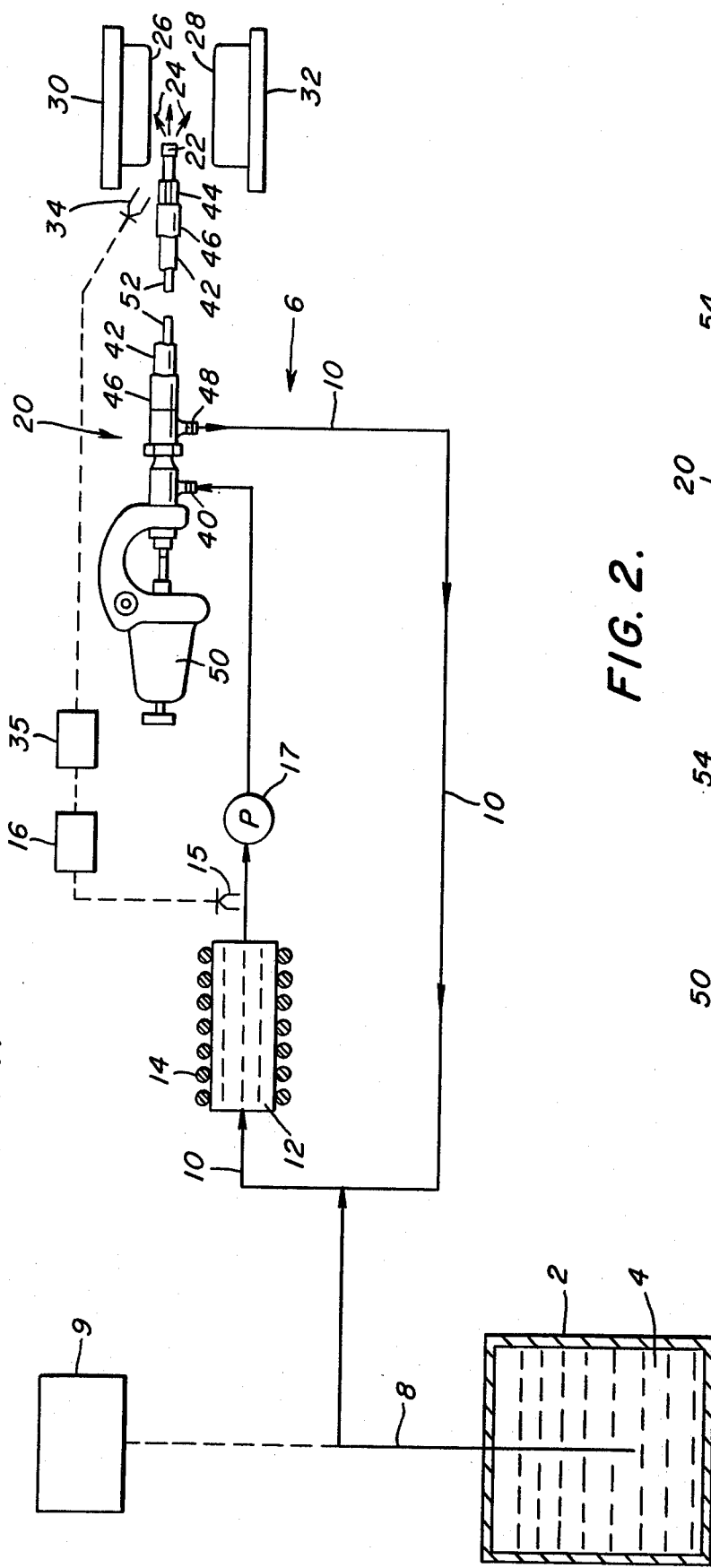
FIG. I.
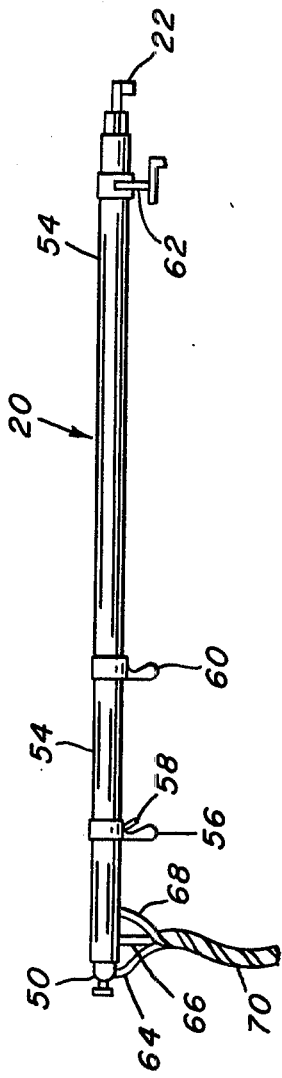
FIG. 2.

METHOD FOR APPLYING LUBRICANTS ONTO METAL WORKING SURFACES

This is a Continuation of application Ser. No. 712,388, filed Aug. 6, 1976 now abandoned.

BACKGROUND OF THE INVENTION

1. Field of Invention

The present invention relates to an improved method for uniformly spraying lubricants onto metal working surfaces such as dies in a forging press, rolls in a rolling mill stand or the like.

2. Brief Description of the Prior Art

Lubricants are applied to metal working surfaces, such as the dies in a heated forging press, for a number of reasons. A uniformly applied coating prevents forged metal from sticking to the dies, insures smooth surfaces on the forged article, reduces die wear and facilitates metal flow during the forging operation.

The most common method of applying lubricant to metal working surfaces is by pneumatic atomization. In this technique high velocity air is mixed with a lubricant prior to the air expansion through a nozzle toward the die or roll surface. Pneumatic atomization utilizes compressed air, approximately 30-100 psi, and produces a fine lubricant spray having drops in the 5-100 micron diameter range.

There are inherent disadvantages with the presently known pneumatic atomization techniques for lubricating metal working surfaces. First, the high velocity air coupled with the fine spray makes it difficult to accurately direct and uniformly apply the lubricant over the entire metal working surface, specially around corner radii and in web areas of intricately shaped dies in a forging press. Second, lubricants, particularly the more commonly used high viscosity lubricants, tend to clog the chambers, tubes and orifices of spraying nozzles. Third, the pneumatic technique inherently supplies a substantial quantity of air to the heated working surfaces where a portion of the lubricant is burned. Air increases the amount and rate of burned lubricant producing a large amount of smoke. This smoke can cause visual and respiratory problems for the workers in the area. Finally, it is time consuming and therefore costly to apply a uniform coat of lubricant when using a fine spray. An increase in spraying time decreases the number of articles that can be formed in a given period and is inefficient from an energy conservation viewpoint.

It has been disclosed in the prior art, such as Larsonneor U.S. Pat. No. 3,707,012 and Lyon et al U.S. Pat. No. 3,605,473, that lubricants for rolling mill applications may be mixed with large quantities, 50 to 99.999 percent of cooling water and the dispersion may be sprayed onto the work rolls under relatively high hydraulic and water pressure to provide an improved coolant and lubricant for the rolls. The oil/water dispersions disclosed in the prior art require mixing at much lower temperatures and application at much higher pressures than the heated lubricants of the present invention. Also, the dispersions disclosed in the prior art have an undesirable cooling effect when applied onto the surfaces of heated dies of a forging press, or the like.

Accordingly, a new method of applying lubricant to metal working surfaces is desired which eliminates the need for high velocity air, quickly applies a uniform coating over the entire working surface utilizing relatively low hydraulic pressure, and does not result in clogging of conventional spraying nozzles. This method prevents metal from sticking to metal working surfaces and increases the life of the dies or rolls.

SUMMARY OF THE INVENTION

The present invention is directed to a method of applying an ordinarily high viscosity lubricant onto metal working surfaces comprising the steps of heating the lubricant to a temperature of approximately 170° to 300° F., hydraulically atomizing the lubricant by feeding the lubricant through a nozzle under a pressure of approximately 30 to 70 pounds per square inch whereby the relative velocity of the lubricant with respect to ambient atmosphere is increased upon exiting an orifice in the nozzle, and directing the lubricant onto the metal working surfaces.

Among the advantages of the present invention is the provision of a method of applying a more uniform coating of lubricant onto metal working surfaces without requiring high velocity air.

A further advantage of this invention is the provision of hydraulically atomizing heated lubricant by utilizing relatively low hydraulic pressure.

Another advantage of the subject invention is the provision of a method of applying ordinarily high viscosity lubricant onto metal working surfaces without clogging the spraying nozzles.

Another objective of this invention is to provide a quick method of spraying lubricant onto metal working surfaces, such as heated dies in a forging press, to increase the number of articles that can be formed in a given period of time.

It follows that an advantage of this invention is the provision of a method of uniformly applying a coating of lubricant onto metal working surfaces utilized in hot metal forming operations whereby the lubricant is sprayed by low pressure hydraulic atomization rather than the more conventional pneumatic atomization.

The foregoing and other objectives and advantages of the present invention will be more thoroughly comprehended and appreciated with reference to the following description and the drawings appended hereto.

BRIEF DESCRIPTION OF THE DRAWINGS

FIG. 1 is a schematic view of an apparatus for practicing the method of the present invention, including a partially fragmentary view of a spray gun of the present invention.

FIG. 2 is a plan view of a spray gun of the present invention.

DESCRIPTION OF THE PREFERRED EMBODIMENTS

Referring particularly to the drawing, FIG. 1 illustrates an apparatus for practicing the method of the present invention which includes a pressurized storage tank 2 for holding an ordinarily high viscosity lubricant 4. A recirculating system 6 includes a recirculating line 10 and a reservoir 12 wherein a major portion of the recirculating lubricant is heated by a heater 14 or the like. A first thermocouple 15 may be provided near the exit end of the reservoir to monitor the temperature of the heated lubricant. A pump 17 is also provided for continuously pumping the lubircant through the system 6.

A conventional spray gun 20 is shown out-of-scale in FIG. 1 to provide additional detail to aid in the explanation of the present method. The spray gun 20 has at least one nozzle 22 at the end thereof through which the lubricant is hydraulically atomized giving off a spray 24. The spray 24 can be directed to the working surfaces 26 and 28 of a reciprocating upper die 30 and a stationary lower die 32, respectively, of a forging press. A second thermocouple 34 may be provided at the exit end of the spray gun to monitor the temperature of the lubricant as it is sprayed and to determine the heat loss from the heater 14 to the spray nozzle 22.

Lubricants, particularly those used for forging aluminum, may be petroleum or mineral oil based. Additives, such as graphite, lead, salts and other fatty compounds, raise the already high viscosity of the lubricant. Ordinarily high viscosity lubricants are those exhibiting a viscosity greater than about 1.7 centipoise, which is approximately double that of water at standard temperature and pressure. The viscosity of water at standard temperature and pressure is about 1.0 centipoise, These high viscosity lubricants are presently used on metal working surfaces such as dies in a forging press, rolls in a rolling mill stand and at times on the metal workpiece itself. Exemplary lubricants used for forging aluminum wheels such as Aluminum Association Alloy 2014 or 2024 and T-6 temper include petroleum base liquid lubricants containing graphite and a lead compound. These exemplary lubricants for forging aluminum exhibit a viscosity of about 300 to 2000 centipoise at 40° C. Lubricants used in rolling mill applications may have much lower viscosities usually on the order of 1.7 to 500 centipoise.

The storage tank 2 may consist of a well known 50, 60 or 120 gallon pressurized lubrication tank. Preferably a quick disconnect plug is located at the bottom of the tank for easy connection to the make-up line 8. The make-up line 8 may consist of a fifteen (15) foot flexible metal hose having, for example, a ⅜ inch inside diameter. The high viscosity lubricant 4 is delivered to the recirculating system 6 through the make-up line 8.

The recirculating system 6 located between the storage tank 2 and the spray gun 20 is a closed loop of constant volume. Preferably the closed loop volume is approximately four (4) gallons. Any volume loss in the system 6 caused by spraying of the lubricant should be almost immediately, and preferably, simultaneously replaced with lubricant from storage 2.

The oil heater 14 in the recirculating system 6 is preferably a flow-through heat exchanger having a reservoir 12 with the capacity for holding approximately seventy-five percent (75%) of the total lubricant in the recirculating system 6. It has been found that a heater capable of producing a surface temperature of 350° F. is adequate to maintain a lubricant temperature of 300° F. in a recirculating system having a four gallon capacity and having a three gallon heat reservoir. The reservoir 12 of the flow-through heat exchanger must be kept flooded to prevent carbonization of the oil.

In a preferred embodiment of the present invention, a first thermocouple 15 is provided in the recirculating line 10 at the exit end of the reservoir 12 to continuously monitor the temperature of the lubricant 4. The thermocouple 15 is connected to a temperature controller and meter 16 to govern the on/off operation of the heater 14. The thermocouple 15 provides the reference temperature to determine when and how long the heater 14 should be operated to maintain the desired oil temperature in the system 6. Maintaining the temperature of the lubricant at 170° to 330° F., and more preferably at 250° to 280° F., lowers the lubricant viscosity and prevents clogging problems through the apparatus.

The pump 17 keeps the oil in the closed loop system 6 in circulation to maintain heat uniformity throughout the system 6 and to prevent the accumulation of sludge deposits. This pump 17 should be able to continuously pump room temperature as well as heated lubricant to maintain oil circulation without heat when the apparatus is not being used for a period of time. It has been found that when the pump 6 has been stopped for more than two hours the recirculating system 6 must be drained to prevent the accumulation of sludge deposits. In an alternative embodiment of this apparatus, provisions are made for connecting both air and solvent type cleaning equipment 9 to the recirculating system 6. Such equipment should be adapted to fit matingly to the connection in the make-up line 8 through which the cleaner is fed into the recirculating system 6.

By pumping the heated oil through the closed loop system 6 at a constant temperature, a constant hydraulic pressure of preferably 30 to 70 pounds per square inch is maintained. In the event that such pressure should increase substantially beyond the preferred range, a regulated pressure relief valve (not shown) should be provided in the pump 17 and heater reservoir 12 to insure that a relatively constant hydraulic pressure is maintained in the system 6.

Referring again to the drawing, FIG. 1 includes a detailed, partially fragmentary view of a preferred spray gun 20 of the present invention. The spray gun 20 is preferably six to eight feet in length from the air valve 50 to the spray nozzle 22. The lubricant 4 is delivered to the spray gun 20 through entrance port 40 and the lubricant 4 continues to flow through a cylindrical delivery line 42. Toward the end of the spray gun 20 is a seal chamber 44 into which the lubricant 4 flows from one direction out of the delivery line 42 then in reverse direction into a concentric return line 46. The lubricant 4 then flows out of the spray gun 20 through exit port 48. The preferred assembly described immediately above forms part of the closed loop recirculating system 6.

When it is desired that the lubricant 4 be sprayed onto metal working surfaces such as dies 30 and 32 in a forging press, a valve 18 should be provided for selectively directing a portion of the recirculating lubricant out of the closed loop system 6 and toward the spray nozzle 22. In the preferred spray gun 20 shown in FIG. 1, an air control valve 50 is provided. The air valve 50, when engaged, will laterally actuate a shaft 52 centrally located in the spray gun 20. Moving the shaft 52 toward the spray nozzle 22 of the spray gun 20 opens the seal chamber 44 thereby allowing lubricant 4 to flow into the spray nozzle 22. Simultaneously with the actuation of the shaft 52, the spray gun return line 46, and thus the recirculating system 6, is closed by, for example, an electrically operated oil solenoid valve (not shown) to maintain constant pressure during spraying. It will be understood by those skilled in the art that the air used to actuate the shaft is not used to atomize the lubricant 4 which is sprayed, the air valve 50 is only utilized to actuate the shaft 52. It should also be understood that the air valve 50 is engaged by a trigger mechanism which may be operated manually or automatically in accordance with this invention.

In order to protect the spray gun 20 from the ambient heat and the rough handling associated with metal forming operations, the gun 20 is covered by ⅜ inch insulation and encased in a two inch diameter protection tube 54 as shown in FIG. 2. The encased spray gun 20 illustrated in FIG. 2 further shows a first handle 56 provided with a trigger mechanism 58 for manually operating the spray gun. A second handle 60 is also provided on the spray gun 20. Toward the nozzle 22 of the gun 20 there may be provided an adjustable locator pin 62 which may be placed at a predetermined position within, for example, retracted dies of a forging press at a certain height and location to assure that a uniform coating of lubricant will be sprayed onto the metal working surfaces. Toward the air valve 50 there is provided an air line 64 for operating the air valve 50, an oil entry line 66 and an oil discharge line 68. These three lines may be braided and insulated in one common line 70.

The lubricant 4 which flows to the spray nozzle 22 is maintained under a constant pressure of approximately 30 to 70 pounds per square inch. During spraying, the lubricant 4 is atomized as it passes through a small orifice in the nozzle tip as a result of jet instability arising from the relative velocity of the pressurized lubricant with respect to the ambient atmosphere. It should be understood by those skilled in the art that impinging or swirling nozzles may also be used and further that a plurality of nozzles may be employed in practicing the method of the present invention. Also, when the lubricant is heated and its viscosity is lowered approximately to that of water, any conventional water nozzle tips may be interchanged in the present apparatus depending on the type and direction of spray desired.

Conventional pneumatic atomizers operated at 30 to 100 pounds per square inch produce a fine spray having drops in the 5 to 100 micron diameter range. Hydraulic atomizers operated at 30 to 200 pounds per square inch produce a relatively coarse spray 24 having drops in the 100 to 3000 micron diameter range, with lower hydraulic pressure producing the larger drops. At lower pressures, a high viscosity lubricant will flow slowly due to internal cohesive forces. As the temperature of these lubricants is increased, the cohesive forces are reduced. Thus, a larger drop size can be produced than in conventional pneumatic atomizers, and yet high pressure with its related difficulties is not required to spray high viscosity lubricants. The coarse spray 24 produced in accordance with the relatively low hydraulic pressure of the present invention results in a more uniform lubricant coating when sprayed on the metal working surfaces in comparison to either the previous method of pneumatic atomization, or the previous method of high pressure hydraulic atomization. Also, more spray is delivered to the metal working surfaces in a shorter time by the present invention resulting in shorter forging cycle time. The coarse spray produced in accordance with the present invention is more directly applied onto the metal working surfaces than the finer spray of the air atomized system which tend to float randomly often away from the metal working surfaces causing environmental problems.

The spray gun 20 of the present invention may be provided with a series of spray nozzles 22 at the end thereof. In accordance with the method of this invention, the spray gun 20 may be manually positioned between heated dies 30 and 32 of a forging press to a predetermind position. This position can be marked for the operator with locater pins 62, or the like. When in proper position, a trigger mechanism 58 is engaged to initiate spraying. The duration of spray may be governed by a timer located in the control unit 16 or by a manually operated trigger mechanism 58. The lubricant 4 sprayed onto a metal working surface from a predetermined symmetrical point source tends to aid in the uniformity of the resulting coating. The desired thickness of the lubricant coating can be accurately controlled by the particular nozzle tip used. Thickness may also be controlled by monitoring the spray time, since the volume of lubricant sprayed is dependent upon pressure and time, and the pressure in the present method is relatively constant. The surface area covered by the lubricant spray is a function of nozzle height above the die surface which can be determined and marked for each particular application.

A second thermocouple 34 is preferably provided to continuously monitor the temperature of the lubricant being sprayed. This thermocouple 34 is connected to a second temperature and control meter 35, and is similar in operation to the first thermocouple 15 and control meter 16. The second thermocouple 34 is utilized to determine heat loss associated with the system. If the heat loss is significant, the heater 14 temperature should be automatically raised to compensate as much as possible. Maximum heat loss will be experienced as spray time and frequency increase and the ordinarily high viscosity lubricant from the storage tank 2 is pumped into the recirculating system 6 to maintain a constant volume in the closed loop.

The dies of a forging press are usually heated to a temperature of approximately 500° to 700° F. When operating with such temperatures, a certain portion of the lubricant sprayed on the surfaces is expected to burn. When the lubricant is sprayed pneumatically, high pressure air is added to the fire resulting in increased burning and thus more smoke is associated with the metal forming operation. The present invention does not supply any additional air to the fire and thus hydraulic atomization results in less smoke in the metal forming operation. Also, unlike many prior art lubricating devices, the present invention does not supply any water onto the hot dies which would result in quantities of undesirable steam in the metal forming operation.

In accordance with the present invention the dies of an 8000 ton hydraulic press used in forging aluminum wheels were test lubricated with a petroleum based liquid lubricant containing graphite and lead additives, having a viscosity in the range of 1000 to 1600 centipoise at 40° C. The test consisted of lubricating a 12 inch inside diameter by 26 inch outside diameter ring pattern on the lower die cavity of a finishing tool used in the forging of truck and bus wheels. A second similar coating of lubricant was applied to the top of an aluminum billet after it was inserted into the die cavity. As a result of this hydraulically atomized spray test, 228 wheels were forged without one rejection, while on the average there is a rejection rate of five percent (5%) associated with the conventional pneumatic atomized spray. This perfect production test is a result of more uniform coating of the lubricant. The uniformity of lubricant was illustrated by square metal flow in the bottom and top trim areas of the forged wheel and by less sticking when removing the forged wheel from the die cavity. Best results with this particular viscosity lubricant were obtained when operating within a lubricant temperature range of 250° to 280° F.

In an alternative embodiment, the spray gun 20 of the present invention may be incorporated into an automatic positioning device. For example, the positioning device may comprise a pneumatically operated piston or rack and pinion reciprocating table. Such a device could be operated by a push button control and would automatically locate the spray nozzle 22 over the target, spray for a predetermined time period and retract.

What is claimed is:

1. A method of uniformly spraying an ordinarily high viscosity nonaqueous lubricant containing solid additives onto the metal working surfaces of heated dies in a forging press comprising the steps of:

heating said lubricant to approximately 170° to 300° F. to reduce its viscosity to approximately 1.0 centipoise;

continuously recirculating a constant volume of said lubricant at a pressure of approximately 30 to 70 pounds per square inch and a temperature of approximately 170° to 300° F. from the source of heat to a spray nozzle;

hydraulically atomizing said recirculating lubricant by selectively feedng said lubricant through said nozzle under said pressure; and directing said atomized lubricant onto said metal working surfaces.

2. A method as set forth in claim 1 further comprising:

monitoring the temperature of said recirculating lubricant.

3. A method as set forth in claim 2 further comprising:

monitoring the heat loss of said lubricant from recirculation to atomization.

4. A method of applying an ordinarily high viscosity, petroleum based, nonaqueous liquid lubricant containing solid additives with a viscosity of from approximately 300 to 2000 centipoise at 104° F. onto the metal working surfaces of heated dies of a forging press comprising the steps of:

heating said lubricnt to a temperature of approximately 170° to 330° F., such that the viscosity of said lubricant approximates that of water at standard temperature and pressure;

continuously recirculating a substantially constant volume of said lubricant from the source of heat to a spray nozzle at a pressure of approximately 30 to 70 pounds per square inch;

hydraulically atomizing said lubricant by feeding said lubricant through said nozzle solely under said pressure of approximately 30 to 70 pounds per square inch; and directing a uniform layer of said lubricant spray onto said metal working surfaces of said forging dies.

5. A method as set forth in claim 4 wherein said lubricant is heated to a temperature of approximately 250° to 280° F.

* * * * *